Nov. 3, 1931.   N. D. NEWBY   1,829,837
SIGNALING SYSTEM
Filed March 5, 1928

INVENTOR
N. D. Newby
BY
ATTORNEY

Patented Nov. 3, 1931

1,829,837

UNITED STATES PATENT OFFICE

NEAL D. NEWBY, OF WOODRIDGE, NEW JERSEY, ASSIGNOR TO AMERICAN TELEPHONE AND TELEGRAPH COMPANY, A CORPORATION OF NEW YORK

SIGNALING SYSTEM

Application filed March 5, 1928. Serial No. 259,364.

This invention relates to improvements in transmission systems and more particularly to the utilization in such systems of gaseous conductor or discharge tubes for the purposes of providing improved impulse receiving and correcting arrangements.

The gaseous conductor or discharge tubes utilized in the arrangements of this invention are tubes filled with a low pressure gaseous content, which, for purposes of illustration, might be neon, argon, helium or combinations of gases of this group. Such tubes have the characteristic that they will break down and become conductive on one voltage and will remain in such conductive state on a much lower voltage. It is one of the primary features of the arrangements of this invention to utilize a discharge tube of the above type in combination with a condenser and resistance so that the character of impulses coming in over a circuit may be controlled, and if desired, corrected. Other objects and features of the invention will appear more fully from the detailed description hereinafter given.

An illustration wherein the arrangements of the invention might be utilized to advantage would arise in the case of a machine switching circuit. Impulses might be sent out from one end of such a circuit to control at the other end thereof a selector switch. These impulses, due to the fact that they might have been sent out manually, or due to distortion in the circuit, might arrive at the selector switch, or other machine switching apparatus, in a distorted character or in undesired relation to each other. However, with the arrangements of this invention, the incoming impulses would be translated into a set of uniform and symmetrical signals before being applied to the particular apparatus they were intended to operate. Obviously, the impulse receiving and correcting arrangements may be utilized in many other instances and circuits other than the one herein referred to for purposes of illustration.

Figure 1:
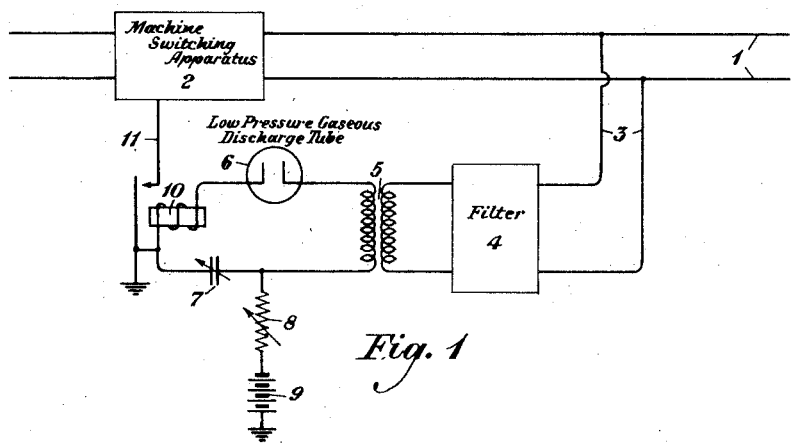
Figure 2:
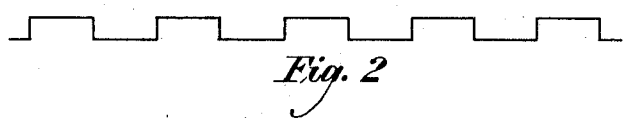
Figure 3:
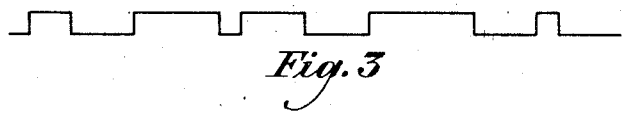
Figure 4:
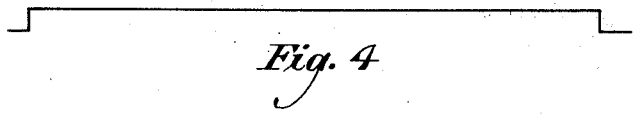

The invention may be more fully understood from the following description together with the accompanying drawings in the Figures 1, 2, 3, and 4, of which the invention is illustrated. Fig. 1 is a circuit diagram illustrating a preferred form of the invention. Figs. 2, 3 and 4 are schematic showings of signals or impulses which may be sent or received with the arrangements of the invention.

In Fig. 1 is shown a section 1 of a transmission line from the distant end of which current impulses would be transmitted. For purposes of illustration, it may be assumed that these impulses are to be utilized to operate a selector switch in machine switching apparatus, which is shown schematically as 2. Bridged across the line 1 would be a circuit 3 which might include a filter 4 selective for the frequency of the signaling impulses transmitted. The circuit 3 would include the primary winding of a transformer 5. The secondary winding of transformer 5 would be included in a circuit arrangement comprising the low pressure gaseous discharge tube 6, the relay 10, the condenser 7, a resistance 8, and a battery 9. The tube 6 is filled with a low pressure gaseous content which may be of neon, argon, helium or combinations of gases of this group. It has the characteristic that it will break down and become conductive on one voltage and when broken down, will remain conductive on a lower voltage. The voltage of battery 9 will be just below the critical or break-down voltage of tube 6. Accordingly, the tube 6 will normally be in a non-conductive state. However, when an impulse comes in over line 1 and is transmitted through transformer 5, the voltage of the impulse added to the voltage of battery 9 will be sufficient to break down the tube 6. This break-down of tube 6 will operate relay 10 and will discharge condenser 7. After the cessation of the incoming current impulse, the tube 6 will not continue to flash, however, even though the voltage of battery 9 is higher than that necessary to maintain the tube 6 in a conductive state. This is due to the fact that when the tube flashes, the condenser 7 will be discharged.

After the condenser 7 has become discharged it will begin to draw a charging current from the source 9, which current will flow through the variable resistance 8. The said resistance is so adjusted in value that the drop in potential, due to the total current flowing therethrough, will be large enough to reduce the total voltage applied across the electrodes of the tube 6 to a value that is lower than that required to maintain the discharge through the said tube.

Accordingly, the tube 6 becomes non-conductive and remains so until the drop in voltage across the resistance 8 is reduced to its minimum, which occurs when the condenser 7 has been fully charged. That permits the full voltage of the source 9, together with the incoming voltage across the transformer 5, to be applied to the tube 6, which will thereupon begin to discharge.

Accordingly it will be seen the tube 6 will break down upon the arrival of each incoming impulse and operate the relay 10. This will close a circuit 11 to operate the selector switch or other apparatus in machine switching arrangement 2.

The rate of the flashing of the tube 6, which as has been pointed out is initiated by the additional voltage of the incoming impulses, may be determined by adjusting the value of one of the elements of the circuit, namely, the value of condenser 7. In other words, by adjusting the capacity of condenser 7, the tube circuit may be tuned to the frequency of the incoming signals. Accordingly, even though the incoming signals may arrive in distorted condition, only perfect signals will be transmitted over circuit 11 to the machine switching apparatus.

In other words, the operation of the circuit including the discharge tube 6 is controlled by the rate of charging and discharging of the condenser 7. This in turn is controlled by its inherent capacity and the values of the resistance 8 and the source of voltage 9. As these elements may be adjusted to a constant value, the circuit arrangement may be made to function in a uniform or constant manner and the result will be a set of uniform or undistorted signals, such as those shown in Fig. 2. Even if the incoming pulses of current should be distorted, as shown in Fig. 3, or should be one long pulse, as shown in Fig. 4, the result in circuit 11 leading to the machine switching apparatus would be a set of uniform pulses such as shown in Fig. 2. The distorted set of incoming pulses shown in Fig. 3 might be caused by interference on the line from other signals or currents.

While the invention has been disclosed as embodied in certain specific arrangements which are deemed desirable, it is understood that it is capable of embodiment in many other and widely varied forms without departing from the spirit of the invention as defined by the appended claims.

What is claimed is:

1. A transmission line, a circuit selective for signaling currents connected therewith, a second circuit including serially a low pressure gaseous discharge tube and a resistance and a source of voltage, said source of voltage being below the break-down voltage of said tube, a transformer for interconnecting said two last mentioned circuits, a condenser connected in shunt of said tube in said second circuit, and responsive means controlled by said discharge tube.

2. An impulse correcting device comprising an incoming circuit over which pulses of current are transmitted, an intermediary circuit inductively connected with said incoming circuit, said intermediary circuit including a source of voltage and a resistance and the combination of a low pressure gaseous discharge tube having a condenser in parallel therewith, said source of voltage being below the breakdown voltage of said tube, and an outgoing circuit controlled by the operation of said discharge tube.

In testimony whereof, I have signed my name to this specification this 3rd day of March, 1928.

NEAL D. NEWBY.